(12) United States Patent
Thayer

(10) Patent No.: US 7,783,935 B2
(45) Date of Patent: Aug. 24, 2010

(54) BIT ERROR RATE REDUCTION BUFFER

(75) Inventor: Larry J. Thayer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1118 days.

(21) Appl. No.: 11/445,589

(22) Filed: Jun. 2, 2006

(65) Prior Publication Data
US 2007/0300104 A1    Dec. 27, 2007

(51) Int. Cl.
| | |
|---|---|
| G11B 20/20 | (2006.01) |
| G06F 11/00 | (2006.01) |
| G01R 31/28 | (2006.01) |
| G11C 29/00 | (2006.01) |
| H04W 4/00 | (2009.01) |
| H04B 10/08 | (2006.01) |

(52) U.S. Cl. .................. 714/700; 714/704; 714/705; 714/712; 714/717; 714/718; 713/503; 370/333; 398/27

(58) Field of Classification Search .................. 714/700, 714/704, 705, 712, 717, 718; 713/503; 370/333; 398/27
See application file for complete search history.

(56) References Cited

U.S. PATENT DOCUMENTS

| | | | | |
|---|---|---|---|---|
| 4,597,058 | A * | 6/1986 | Izumi et al. | |
| 6,502,161 | B1 * | 12/2002 | Perego et al. | |
| 7,093,061 | B2 * | 8/2006 | Teo | 711/101 |
| 7,168,027 | B2 * | 1/2007 | Lee et al. | 714/775 |
| 7,356,756 | B1 * | 4/2008 | Chan et al. | 714/781 |
| 7,454,537 | B1 * | 11/2008 | Xue | 710/52 |
| 2004/0236877 | A1 * | 11/2004 | Burton | 710/22 |
| 2008/0301533 | A1 * | 12/2008 | Lee et al. | 714/774 |
| 2009/0013108 | A1 * | 1/2009 | Rajamani | 710/71 |

OTHER PUBLICATIONS

Tektronix, Preparing for FB-DIMM and DDR2 Are you ready? (article) May 25, 2005, pp. 1-7, Tektronix, Inc. USA.*
Reza Bacchus and Vincent Nguyen, Method and Apparatus for Providing the Proper Voltage to a Memory (U.S. Patent Application), filed Jan. 31, 2005, U.S. Appl. No. 11/047,196.*
Gürsoy, Design and Realization of a 2.4Gbps-3.2Gbps Clock and Data Recovery Circuit, Jan. 2003, p. 150.*

* cited by examiner

Primary Examiner—John J Tabone, Jr.

(57) ABSTRACT

In a preferred embodiment, the invention provides a circuit for reducing bit error rates. A data recovery circuit recovers data from a first HSS link to differential bit pair inputs. Data from the differential bit pair outputs of the data recovery circuit drive differential bit pair inputs to a plurality of FIFOs. The data is then driven from a parallel output of the plurality of FIFOs to the parallel input of a synchronizer. The data is then driven from the parallel output of the synchronizer to the parallel input of a serializer. The serializer, through different bit pair outputs, drives a second serial HSS link.

4 Claims, 5 Drawing Sheets

BIT ERROR RATE REDUCTION BUFFER

BACKGROUND

High speed serial (HSS) links have, in many cases, replaced shared parallel buses in such areas as storage devices, multimedia PCs, entertainment systems, and telecom systems. As a result, standard interfaces such as XAUI (Xilinx Attachment Unit Interface), Serial ATA (Advanced Technology Attachment), PCI (Peripheral Component Interconnect) Express, HDMI (High Definition Multimedia Interface), and FB-DIMM (Fully Buffered Dual In-Line Memory Module) have emerged to provide improved throughput using serial signaling rates in the GHz range.

HSS links provide distinct system implementation advantages. When compared to traditional parallel interfaces, HSS links can provide lower cost by using fewer I/O pins and simplified routing. Printed circuit board (PCB) area used for connecting signals can be reduced substantially because of the utilization of fewer layers, fewer components, and the reduction of on-board termination elements. Because differential signals are commonly used with HSS links, noise tolerance is improved, better voltage margins are achieved, and electromagnetic interference (EMI) radiation is reduced. HSS links can also reduce data skew among multiple parallel lines. In addition, since the clock may be embedded in the serial data stream, issues of timing and clock skew may be reduced as well.

While the advantages of HSS links have driven the standardization and fast adoption of HSS links, HSS links present many challenges to designers. Reliable signal transmission across a motherboard or between daughter cards may be difficult to achieve at GHz speeds. As data rates approach 3 Gbit/s and higher, the number of variables for which a board designer must account is enormously complex. A quantitative understanding of such variables as dielectric constant, return loss, inter-symbol interference (ISI) jitter, and dynamic variances such as temperature and humidity change is necessary to achieve GHz speeds.

HSS links often have a maximum limit for BER (bit error rate). BER is the percentage of bits with errors divided by the total number of bits that have been transmitted, received or processed over a given time period. JEDEC (Joint Electronic Devices Engineering Council, part of the Electronic Industries Association that publishes specifications and standards for electronic components) specifies in its FBD (Fully Buffered DIMM) specification, for example, a maximum BER of $10^{-12}$ bits/sec when driving from a memory controller to a DIMM (dual in-line memory module). When a HSS link becomes physically too long, the BER on that link may increase beyond the required specification. In this type of situation, it becomes necessary to reduce the BER without sacrificing frequency requirements or changing the electrical characteristics of the board.

There is a need in the art for an electronic device that improves BER on HSS links that would otherwise fail to meet a required specification.

DETAILED DESCRIPTION

Figure 1:
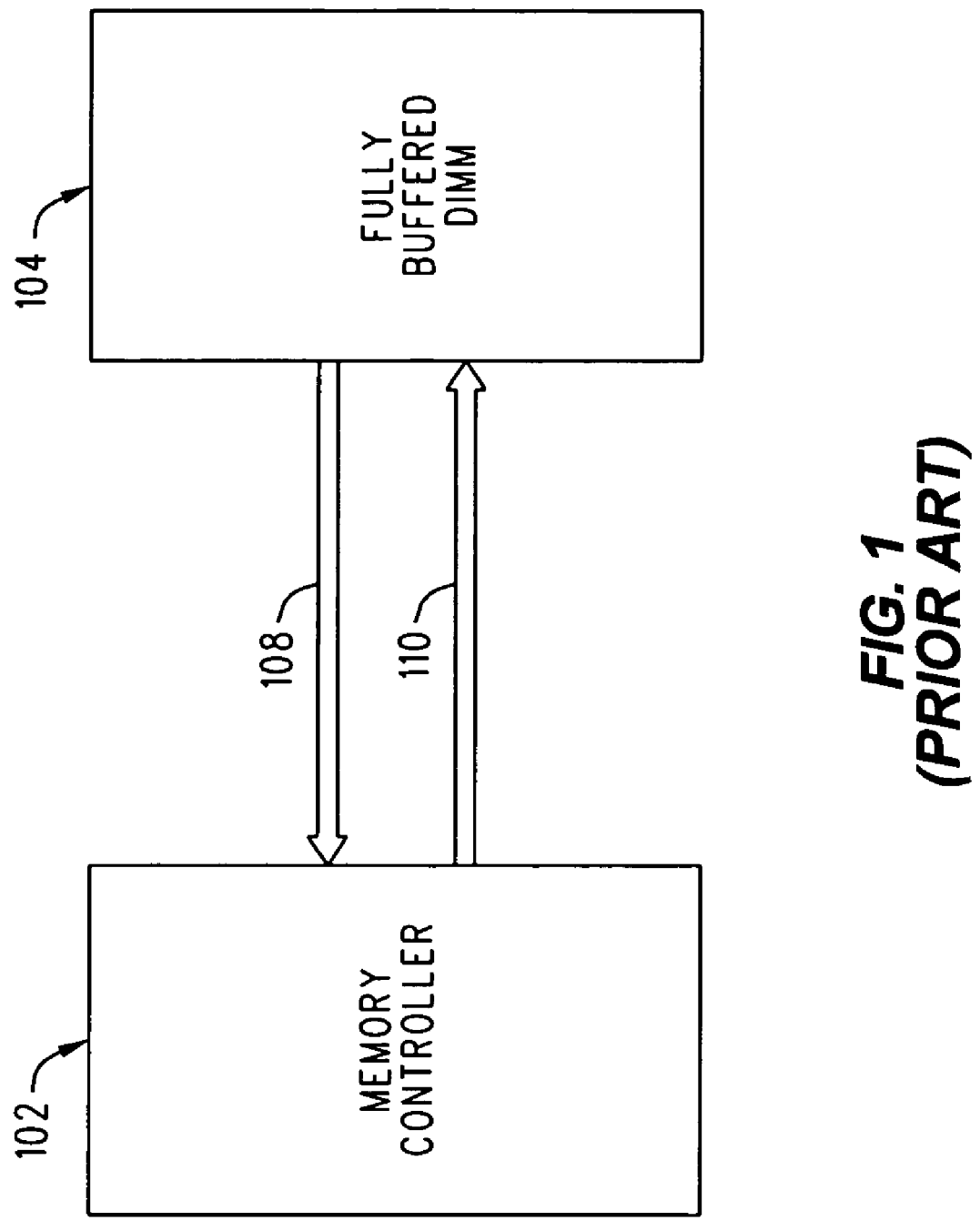
FIG. 1 is a block diagram of a memory controller, high speed serial links, and a fully buffered dual in-line memory module (FB DIMM). (Prior art)

FIG. 1 is a block diagram of a memory controller, 102, high speed serial (HSS) links, 108, and 110, and a fully buffered dual in-line memory module (FBDIMM) 104. Data may be driven from a memory controller, 102, to a FBDIMM, 104, via HSS link, 110. Each HSS link, 108 and 110 contains a plurality of lanes where an individual lane comprises a differential bit pair. Data may also be driven from the FBDIMM, 104, to the memory controller, 102, via HSS link, 108. Today, because signals may be switched at frequencies in the GHz range, the dispersive nature of a PC board and the physical length of the HSS links reduce signal strength such that noise induces errors. Bit errors may be reduced by improving the electrical characteristics of the PC board or by shortening the physical length of the HSS links.

Figure 2:
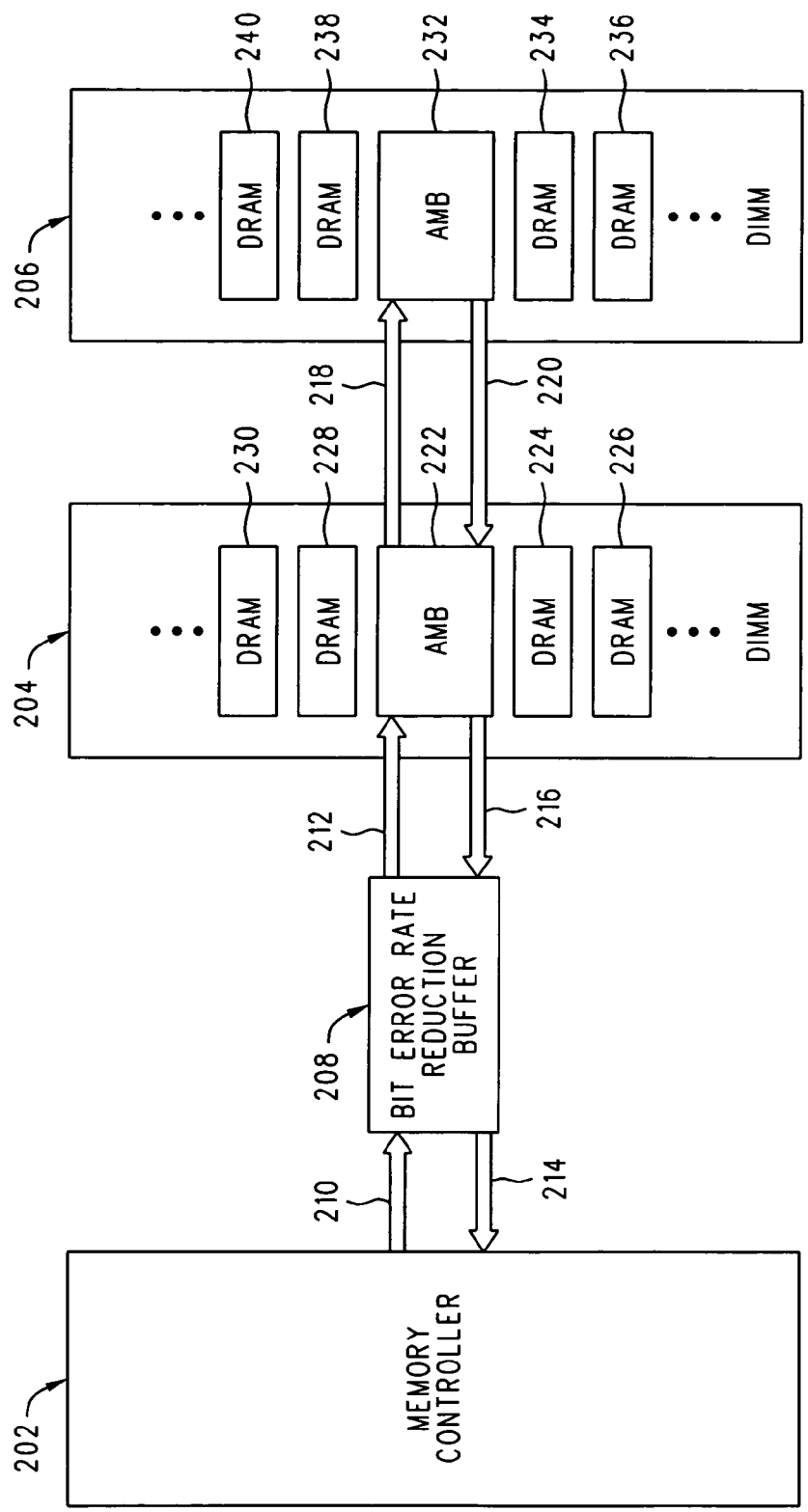
FIG. 2 is a block diagram of an embodiment of an electronic system for improving BER on HSS links.

FIG. 2 is a block diagram of an embodiment of a system for improving Bit Error Rate (BER) on HSS links. An HSS link may have any number of lanes (differential bit pairs). In this example, the HSS links pointing to the right, 210, 212, and 218, have the same number of lanes. In this example, the HSS links pointing to the left, 220, 216, and 214 have the same number of lanes. However, the HSS links that point to the right, 210, 212, and 218 are not required to have the same number of lanes as the HSS links that point to the left, 220, 216, and 214. HSS link 210 is not required to have the same number of lanes as HSS links, 212 and 218. HSS link 214 is not required to have the same number of lanes as HSS links, 216 and 220.

In this embodiment, a memory controller, 202, drives differential signals along HSS link, 210, to a bit error rate reduction buffer, 208. When the differential signals reach the bit error rate reduction buffer, 208, the bit error rate reduction buffer, 208, may retrieve the clock and data, may buffer the data, may check for errors, and may reduce skew between lanes. In addition, the bit error rate reduction buffer, 208, may operate internally either in a serial or parallel mode. After data has been operated on by the bit error rate reduction buffer 208, it is resent serially along HSS link 212 to DIMM (Dual In-Line Memory Module), 204 and along HSS link 218 to DIMM, 206.

DIMM 204 includes an AMB (advanced memory buffer) 222. The AMB, 222, provides control and interface signals to the DRAMs (dynamic random access memory), 224, 226, 228; and 230, on the DIMM 204. DIMM 206 includes an AMB (advanced memory buffer) 232. The AMB, 232, provides control and interface signals to the DRAMs (dynamic random access memory), 234, 236, 238, and 240, on the DIMM 206.

Data may also be driven from DIMM 206 through HSS link, 220, through HSS link, 216, to the bit error rate reduction buffer, 208. In this block diagram, data is driven to the left. When the differential signals reach the bit error rate reduction buffer, 208, the bit error rate reduction buffer, 208, may retrieve the clock and data, may buffer the data, may check for errors, and may reduce skew between lanes. In addition, the bit error rate reduction buffer, 208, may operate internally either in a serial or parallel mode. After data has been operated on by the bit error rate reduction buffer 208, it is resent serially along HSS link 214 to memory controller 202.

Data may also be driven from DIMM 204 through RSS link, 216, to the bit error rate reduction buffer, 208. In this block diagram, data is driven to the left. When the differential signals reach the bit error rate reduction buffer, 208, the bit error rate reduction buffer, 208, may retrieve the clock and data, may buffer the data, may check for errors, and may reduce skew between lanes. In addition, the bit error rate reduction buffer, 208, may operate internally either in a serial or parallel mode. After data has been operated on by the bit error rate reduction buffer 208, it is resent serially along HSS link 214 to memory controller 202.

Figure 3:
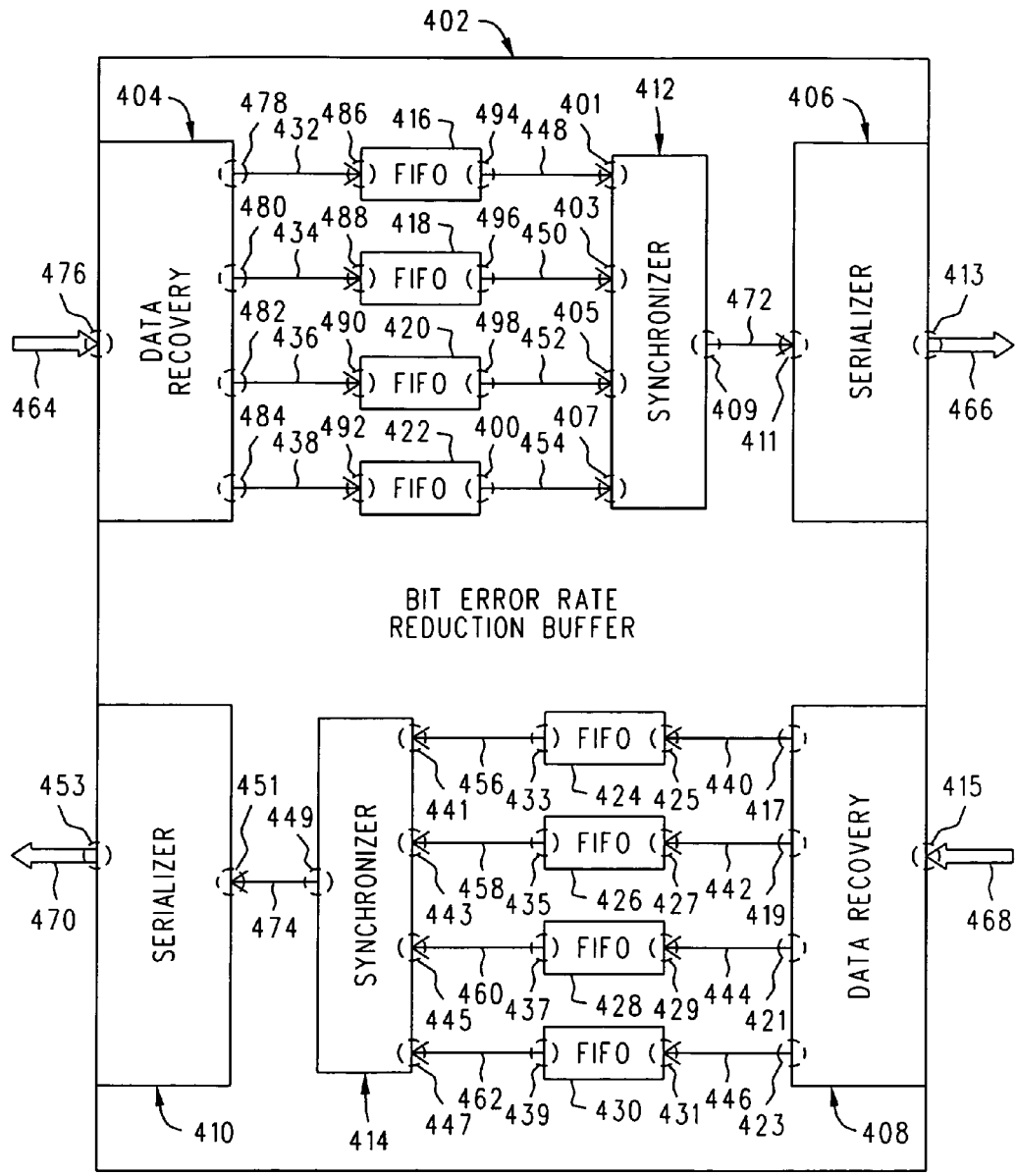
FIG. 3 is a block diagram of an embodiment of a bit error rate reduction buffer with skew reduction.

FIG. 3 is a block diagram of an embodiment of a bit error rate reduction buffer, 402, with skew reduction. A HSS link, 464, drives the differential bit pair inputs, 476, of data recovery circuit, 404. Data and clock are retrieved from the HSS link, 464. A PLL (phase-locked loop) may be used as part of the data recovery circuit, 404. The data recovery circuit, 404, through differential bit pair outputs, 478, 480, 482, and 484, drives lanes, 432, 434, 436, and 438, respectively, into the differential bit pair inputs, 486, 488, 490, and 492, of FIFOs (First In First Out storage), 416, 418, 420, and 422 respectively. Because data from FIFOs 416, 418, 420, and 422 is clocked out at nearly the same time, skew between lanes 448, 450, 452, and 454 may be reduced. Data from the outputs, 494, 496, 498, and 400, of FIFOs, 416, 418, 420, and 422 respectively is clocked in parallel through lanes, 448, 450, 452, and 454 into inputs, 401, 403, 405, and 407 of synchronizer 412. The parallel output, 409, of synchronizer 412 then synchronizes the data from lanes 448, 450, 452, and 454. The parallel output, 409, of synchronizer, 412, is then driven into serializer, 406 through bus 472. Serializer, 406, through differential bit pair outputs, 413, then drives HSS link 466.

A HSS link, 468, drives the differential bit pair inputs, 415, of data recovery circuit, 408. Data and clock are retrieved from the HSS link, 468. The data recovery circuit, 408, through differential bit pair outputs, 417, 419, 421, and 423, drives lanes, 440, 442, 444, and 446, respectively, into the differential bit pair inputs, 425, 427, 429, and 431, of FIFOs, 424, 426, 428, and 430 respectively. A PLL may be used as part of the data recovery circuit, 408. Because data from FIFOs 424, 426, 428, and 430 is clocked out at nearly the same time, skew between lanes 456, 458, 460, and 462 may be reduced. Data from the outputs, 433, 435, 437, and 439, of FIFOs, 424, 426, 428, and 430 respectively is clocked in parallel through lanes, 456, 458, 460, and 462 into inputs, 441, 443, 445, and 447 of synchronizer 414. The parallel output, 449, of synchronizer 414 then synchronizes the data from lanes 456, 458, 460, and 462. The parallel out, 449, of synchronizer, 414, is then driven into serializer, 410, through bus 474. Serializer, 410, through differential bit pair outputs, 453, then drives HSS link 470. In this example, the HSS links pointing to the right, 464, and 466, have the same number of lanes. In this example, the HSS links pointing to the left, 468 and 470, have the same number of lanes. However, the HSS links that point to the right, 464 and 466 are not required to have the same number of lanes as the HSS links that point to the left, 468 and 470. HSS link 464 is not required to have the same number of lanes as HSS link 466. HSS link 468 is not required to have the same number of lanes as HSS link 470. Differential signals are not required for signals internal to the bit error rate reduction buffer, 402.

Figure 4:
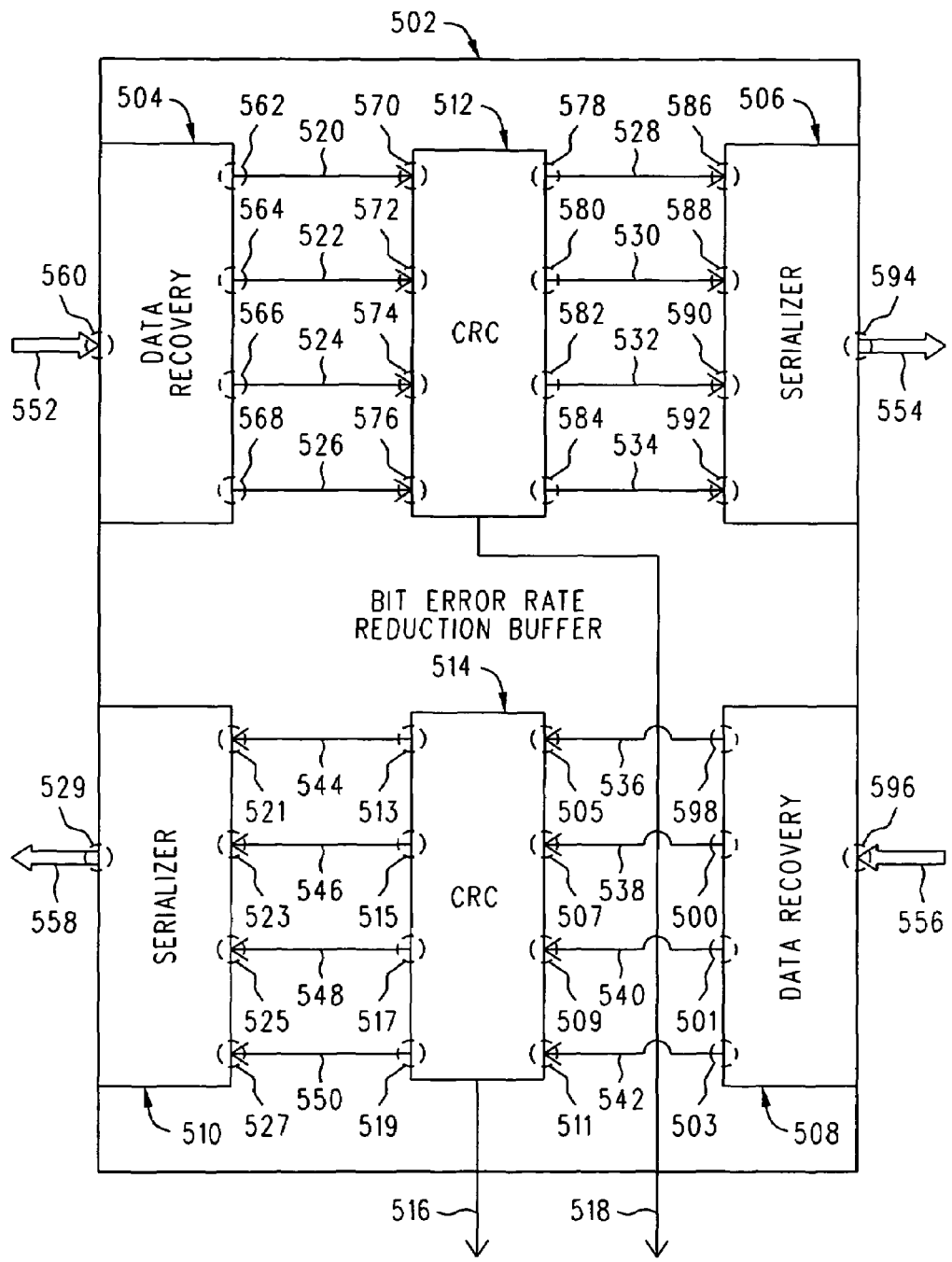
FIG. 4 is a block diagram of an embodiment of a bit error rate reduction buffer with fault-isolation.

FIG. 4 is a block diagram of an embodiment of a bit error rate reduction buffer, 502, with fault-isolation. A HSS link, 552, drives the differential bit pair inputs, 560, of the data recovery circuit, 504. A PLL may be used as part of the data recovery circuit, 504. Data and clock are retrieved from the HSS link, 552. The differential bit pair outputs, 562, 564, 566, and 568 of the data recovery circuit, 504, drive lanes, 520, 522, 524, and 526, into the differential bit pair inputs, 570, 572, 574, and 576 of CRC (cyclic redundancy check) circuit, 512. If an error is detected, the fault-isolation indicator, 518, sends a signal that indicates an error may have occurred in lane 520, 522, 524, or 526. CRC circuit, 512, through differential bit pair outputs, 578, 580, 582, and 584, drives the differential bit pair inputs, 586, 588, 590, and 592, of serializer, 506, through lanes 528, 530, 532, and 534 respectively. Serializer, 506, then sends the data through differential bit pair output, 594 to HSS link 554.

A HSS link, 556, drives the differential bit pair inputs, 596, of the data recovery circuit, 508. Data and clock are retrieved from the HSS link, 556. A PLL may be used as part of the data recovery circuit, 508. The differential bit pair outputs, 598, 500, 501, and 503 of the data recovery circuit, 508, drive lanes, 536, 538, 540, and 542, into the differential bit pair inputs, 505, 507, 509, and 511 of CRC (cyclic redundancy check) circuit, 514. If an error is detected, the fault-isolation indicator, 516, sends a signal that indicates an error may have occurred in lane 536, 538, 540, or 542. CRC circuit, 514, through differential bit pair outputs, 513, 515, 517, and 519, drives the differential bit pair inputs, 521, 523, 525, and 527, of serializer, 510 through lanes 544, 546, 548, and 550 respectively. Serializer 510 then sends the data through differential bit pair output, 529 to HSS link, 558. In this example, the HSS links pointing to the right, 552, and 554, have the same number of lanes. In this example, the HSS links pointing to the left, 556 and 558, have the same number of lanes. However, the HSS links that point to the right, 552 and 554 are not required to have the same number of lanes as the HSS links that point to the left, 556 and 558. HSS link 552 is not required to have the same number of lanes as HSS link 554. HSS link 556 is not required to have the same number of lanes as HSS link 558. Differential signals are not required for signals internal to the bit error rate reduction buffer, 502.

Figure 5:
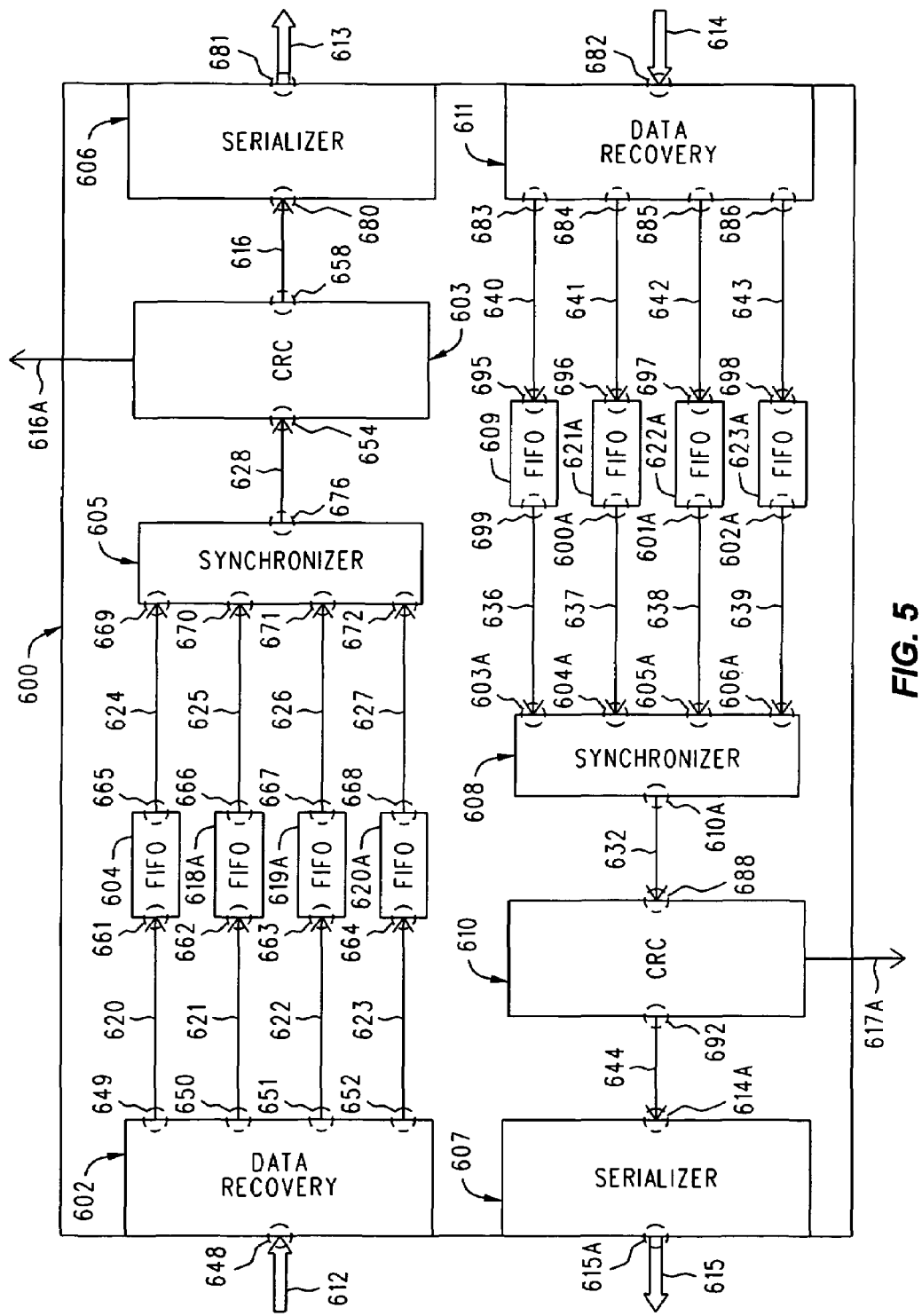
FIG. 5 is a block diagram of an embodiment of a bit error rate reduction buffer with fault-isolation and skew reduction.

FIG. 5 is a block diagram of an embodiment of a bit error reduction buffer, 600, with skew reduction and fault isolation. A HSS link, 612, drives the differential bit pair inputs, 648, of the data recovery circuit, 602. A PLL may be used as part of the data recovery circuit, 602. Data and clock are retrieved from the HSS link, 612. The differential bit pair outputs, 649, 650, 651, and 652 of the data recovery circuit, 602, drive lanes, 620, 621, 622, and 623, into the differential bit pair inputs, 661, 662, 663, and 664 of FIFOs, 604, 618A, 619A, and 620A, respectively. Because data from FIFOs 604, 618A, 619A, and 620A, is clocked out at nearly the same time, skew between lanes 624, 625, 626, and 627 may be reduced. Data from the outputs, 665, 666, 667, and 668, of FIFOs, 604, 618A, 619A, and 620A respectively is clocked in parallel through lanes, 624, 625, 626, and 627 into inputs, 669, 670, 671, and 672 of synchronizer 605. The parallel output, 676, of synchronizer 605 then synchronizes the data from lanes 624, 625, 626, and 627. The parallel output, 676, of synchronizer, 605, is then driven into the parallel input, 654, of CRC circuit, 603, though bus 628. If an error is detected, the fault-isolation indicator, 616A, sends a signal that indicates an error may have occurred in lane 624, 625, 626, or 627. CRC circuit, 603, through parallel output, 658, drives parallel input, 680, of serializer, 606, through bus 616. Serializer, 606, through differential bit pair outputs, 681, then drives HSS link 613.

A HSS link, 614, drives the differential bit pair inputs, 682, of the data recovery circuit, 611. A PLL may be used as part of the data recovery circuit, 611. Data and clock are retrieved from the HSS link, 614. The differential bit pair outputs, 683, 684, 685, and 686 of the data recovery circuit, 611, drive lanes, 640, 641, 642, and 643, into the differential bit pair inputs, 695, 696, 697, and 698 of FIFOs, 609, 621A, 622A, and 623A, respectively. Because data from FIFOs 609, 621A, 622A, and 623A, is clocked out at nearly the same time, skew between lanes 636, 637, 638, and 639 may be reduced. Data from the outputs, 699, 600A, 601A, and 602A, of FIFOs, 609, 621A, 622A, and 623A respectively is clocked in parallel through lanes, 636, 637, 638, and 639 into inputs, 603A, 604A, 605A, and 606A of synchronizer 608. The parallel output, 610A, of synchronizer 608 then synchronizes the data from lanes 636, 637, 638, and 639. The parallel output, 610A, of synchronizer, 608, is then driven into the parallel input, 688, of CRC circuit, 610, though bus 632. If an error is detected, the fault-isolation indicator, 617A, sends a signal that indicates an error may have occurred in lane 636, 637, 638, or 639. CRC circuit, 610, through parallel output, 692, drives parallel input, 614A, of serializer, 607, through bus 644. Serializer, 607, through differential bit pair outputs, 615A, then drives HSS link 615. In this example, the HSS links pointing to the left, 614 and 615, have the same number of lanes. However, the HSS links that point to the right, 612 and 613 are not required to have the same number of lanes as the HSS links that point to the left, 614 and 615. HSS link 612 is not required to have the same number of lanes as HSS link 613. HSS link 614 is not required to have the same number of lanes as HSS link 615. Differential signals are not required for signals internal to the bit error rate reduction buffer, 600.

When the BER of an HSS link such as the HSS link 108 (FIG. 1) fails to meet a required specification, a bit error rate reduction buffer 208 (FIG. 2) may be used to reduce the BER and meet the required specification. One way this may be accomplished is by physically dividing the HSS link 108 into two separate HSS links 210 and 212, each link 210, 212 being about half the length of the original HSS link 108, and then physically and electrically connecting the bit error rate reduction buffer 208 between the two divided HSS links 210 and 212. Because each of the links 210 and 212 is about half the length of the HSS link 108, the HSS link 210 will have substantially the same length as the HSS link 212. The bit error rate reduction buffer 208 improves the BER by recovering data at a point with a higher signal-to-noise ratio. In addition, the bit error rate reduction buffer 208 may indicate when an error occurs through a fault-isolation indicator.

The foregoing description has been presented for purposes of illustration and description. It is not intended to be exhaustive or to limit the invention to the precise form disclosed, and other modifications and variations may be possible in light of the above teachings. The exemplary embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A bit error rate reduction buffer comprising:
   a data recovery circuit, the data recovery circuit having differential bit pair inputs and differential bit pair outputs;
   a plurality of FIFOs, the plurality of FIFOs having differential bit pair inputs and a parallel output;
   a synchronizer, the synchronizer having a parallel input and a parallel output;
   a serializer, the serializer having a parallel input and differential bit pair outputs;
   wherein the differential bit pair outputs of the data recovery circuit are connected to the differential bit pair inputs of the plurality of FIFOs;
   wherein the parallel output of the plurality of FIFOs is connected to the parallel input of the synchronizer;
   wherein the parallel output of the synchronizer is connected to the parallel input of the serializer;
   such that the differential bit pair inputs of the data recovery circuit are driven by a first high speed serial (HSS) link;
   such that the different bit pair outputs of the serializer drive a second HSS link.

2. The bit error rate reduction buffer as in claim 1 wherein a phase-locked look (PLL) is used as part of the data recovery circuit.

3. A method comprising:
   selecting a first length of a first high speed serial (HSS) link to be substantially equal to a second length of a second HSS link; and
   coupling a bit error rate reduction buffer between the first HSS link and the second HSS link, wherein the bit error rate reduction buffer comprises:
   a data recovery circuit, the data recovery circuit having differential bit pair inputs and differential bit pair outputs;
   a plurality of FIFOs, the plurality of FIFOs having differential bit pair inputs and a parallel output;
   a synchronizer, the synchronizer having a parallel input and a parallel output;
   a serializer, the serializer having a parallel input and differential bit pair outputs;
   wherein the differential bit pair outputs of the data recovery circuit are connected to the differential bit pair inputs of the plurality of FIFOs;
   wherein the parallel output of the plurality of FIFOs is connected to the parallel input of the synchronizer;
   wherein the parallel output of the synchronizer is connected to the parallel input of the serializer;
   such that the differential bit pair inputs of the data recovery circuit are driven by the first HSS link;
   such that the different bit pair outputs of the serializer drive the second HSS link.

4. An electronic system comprising:
   a memory block;
   a memory controller;
   first and second high speed serial (HSS) links;
   a bit error rate reduction buffer having:
      a data recovery circuit, the data recovery circuit having differential bit pair inputs and differential bit pair outputs;
      a plurality of FIFOs, the plurality of FIFOs having differential bit pair inputs and a parallel output;
      a synchronizer, the synchronizer having a parallel input and a parallel output;
      a serializer, the serializer having a parallel input and differential bit pair outputs;
      wherein the differential bit pair outputs of the data recovery circuit are connected to the differential bit pair inputs of the plurality of FIFOs;
      wherein the parallel output of the plurality of FIFOs is connected to the parallel input of the synchronizer;
      wherein the parallel output of the synchronizer is connected to the parallel input of the serializer;
      such that the differential bit pair inputs of the data recovery circuit are driven by the first HSS link;
      such that the different bit pair outputs of the serializer drive the second HSS link;
   the memory controller being coupled to a first end of the first HSS link;
   the bit error reduction buffer being coupled to a second end of the first HSS link;
   a first end of the second HSS link being coupled to the bit error reduction buffer;
   a second end of the second HSS link being coupled to the memory block.

* * * * *